Sept. 1, 1970 W. B. RISKEN 3,526,374
COMBINATION HYDROFOIL AND WHEEL APPARATUS FOR
AMPHIBIOUS AIRCRAFT
Filed Aug. 12, 1968 4 Sheets-Sheet 1
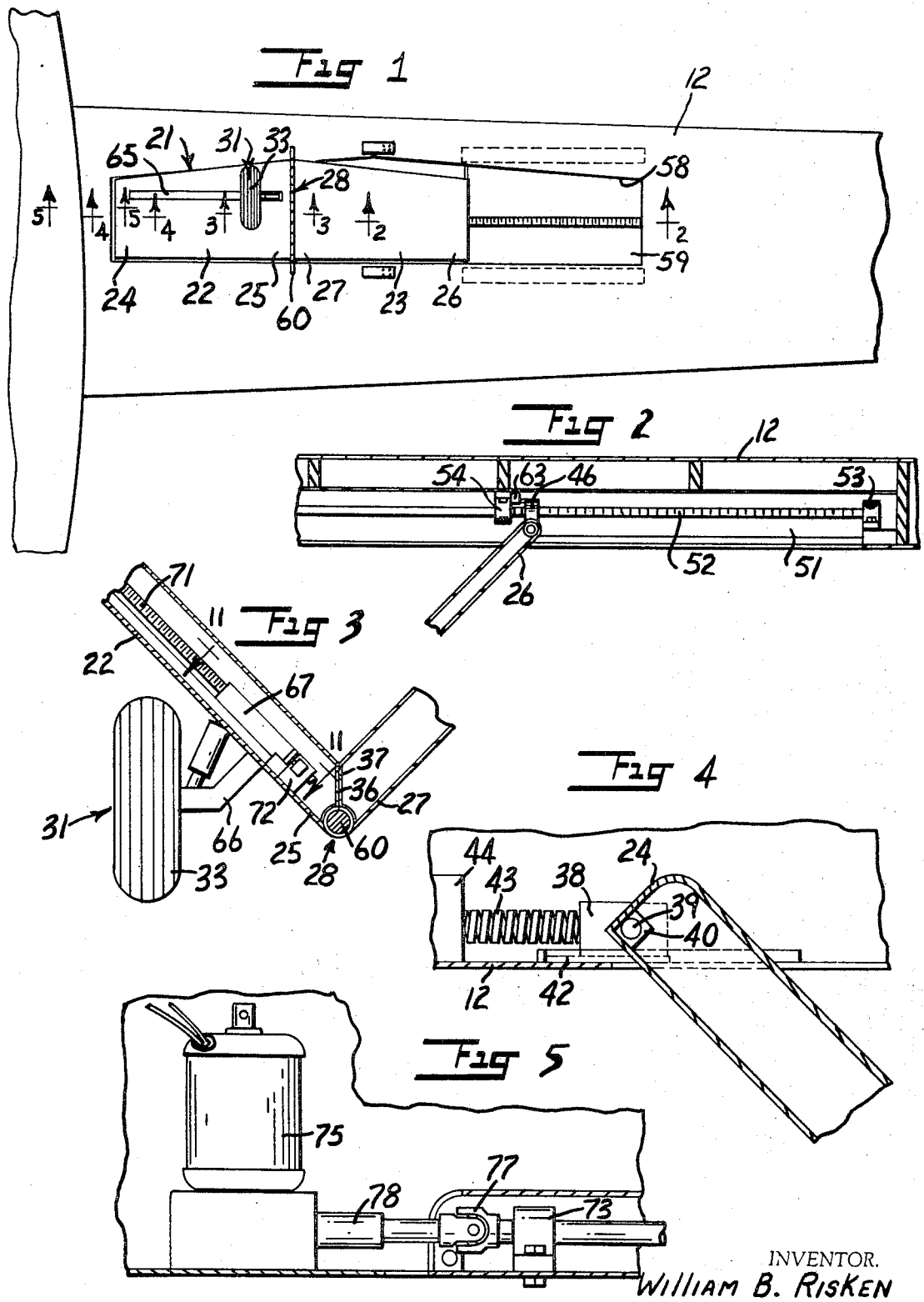
INVENTOR.
William B. Risken
BY
Wells & St. John
Attys.

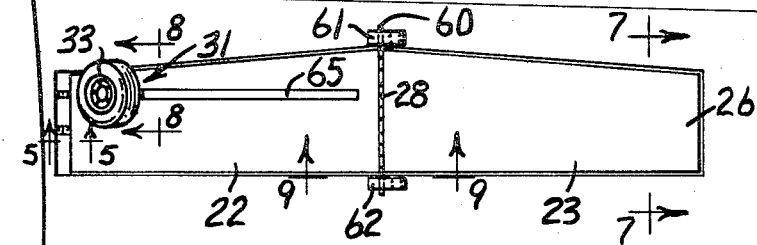
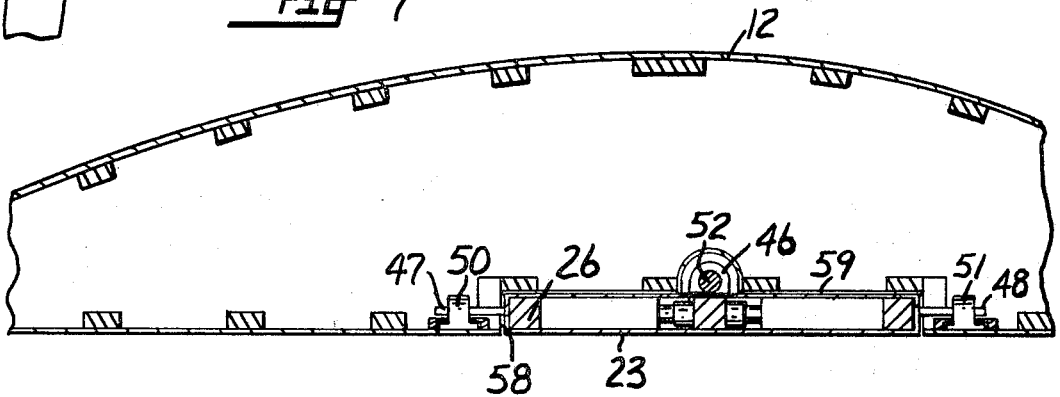
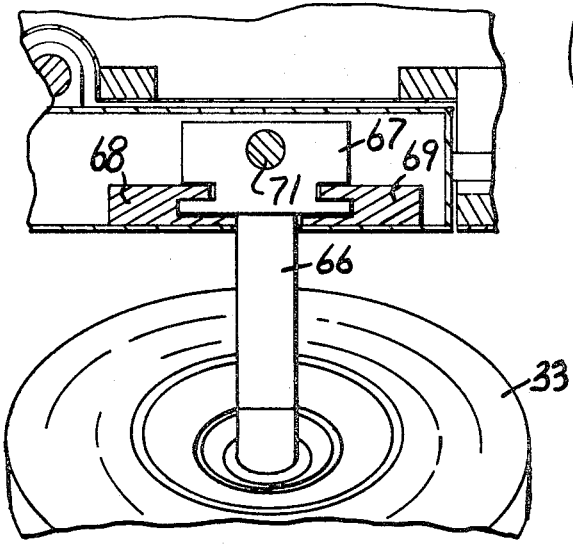
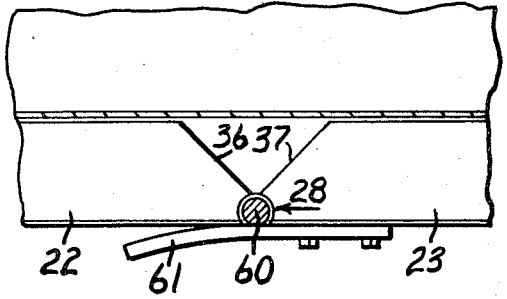

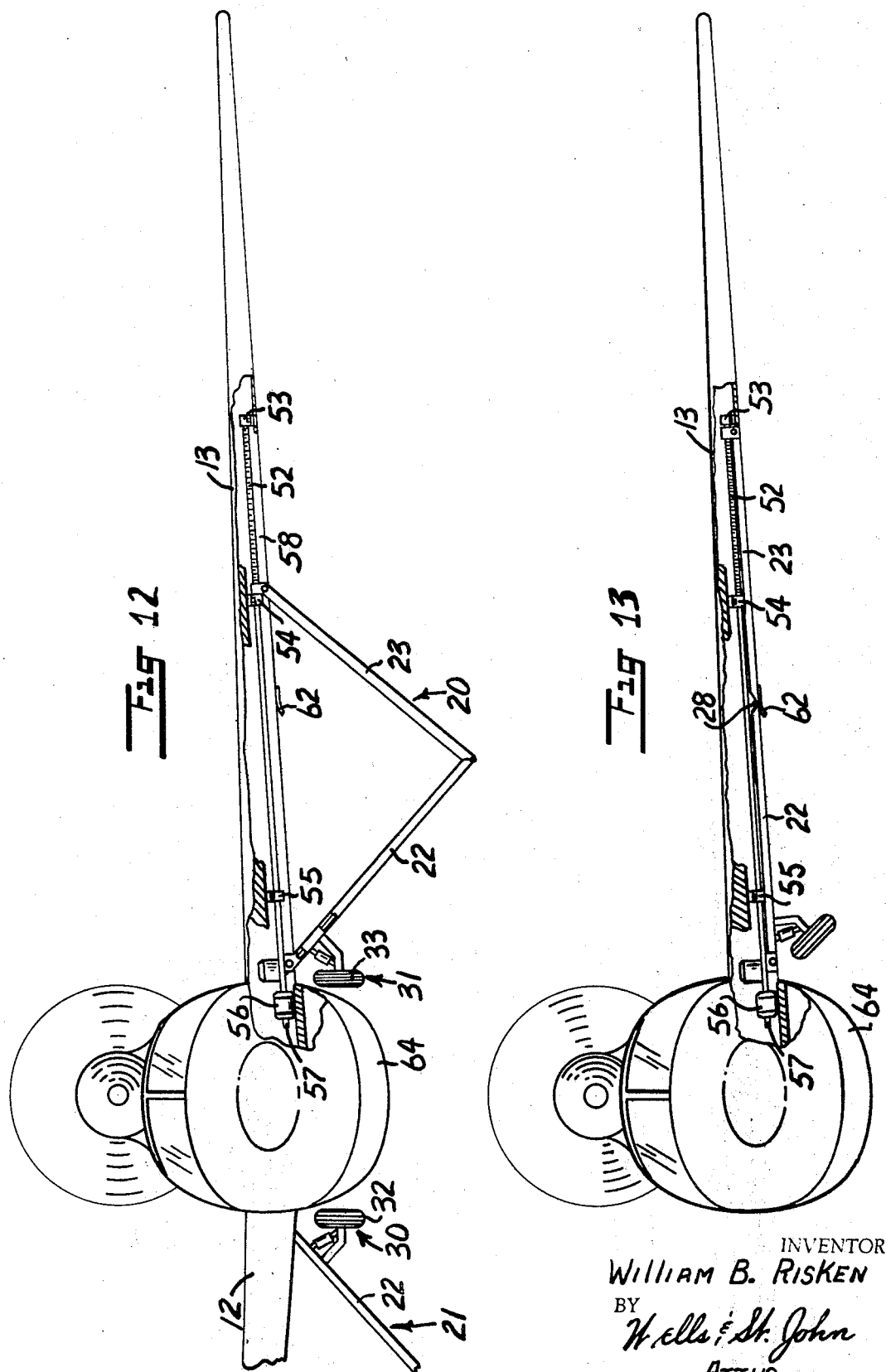

United States Patent Office 3,526,374
Patented Sept. 1, 1970

3,526,374
COMBINATION HYDROFOIL AND WHEEL APPARATUS FOR AMPHIBIOUS AIRCRAFT
William B. Risken, 4004 N. Herald St.,
Spokane, Wash. 99206
Filed Aug. 12, 1968, Ser. No. 752,006
Int. Cl. B64c 25/66
U.S. Cl. 244—101                                    11 Claims

ABSTRACT OF THE DISCLOSURE

A combination hydrofoil and wheel apparatus is described for enabling an amphibious aircraft to land on water or on the ground. The hydrofoil is foldable from a flat cruising position housed in a well underneath the wing section to a landing V-shaped position projecting downward beneath the wing section. A lead screw is connected to one end of the hydrofoil. A wheel is mounted on the hydrofoil for movement along one leg of the hydrofoil from a raised position adjacent the wing section to a landing position with the wheel projecting below the hydrofoil.

BACKGROUND OF THE INVENTION

This invention relates to landing equipment for amphibious airplanes and more particularly to a combination hydrofoil and wheel apparatus for enabling airplanes to land either on the water or on land.

One of the principal problems generally associated with amphibious airplanes is the requirement for providing a sturdy boat-like hull for the air frame to withstand the pounding that is normally encountered in landing on water. On take-off the surface tension between the hull and water is substantial requiring larger engine capacity. Such a hull or pontoon arrangement also adds considerable weight to the aircraft and frequently hinders the flight performance of the airplane. The air stream efficiency is greatly compromised by the requirement of such a hull. This problem becomes further accented when the amphibious airplane is provided with wheel apparatus for enabling the airplane to land on the ground.

One of the principal objects of this invention is to provide a new and unobvious hydrofoil apparatus for amphibious airplanes that enables the aircraft to be built without a boat-like hull configuration.

An additional object of this invention is to provide a hydrofoil apparatus for amphibious airplanes that may be collapsed into the air frame in a very efficient manner requiring a minimum of space.

A further object of this invention is to provide a collapsible hydrofoil apparatus with a very simple drive means for efficiently and accurately folding the hydrofoil elements into a landing position.

An additional object of this invention is to provide a hydrofoil apparatus that provides a support for landing wheels to enable an amphibious airplane to land on the ground.

A further object of this invention is to provide a combination hydrofoil and wheel apparatus for amphibious airplanes that is very efficient and economical to manufacture and install.

An additional object of this invention is to provide a combination hydrofoil and wheel apparatus that may be easily moved from a cruising raised position to a landing lowered position.

These and other objects and advantages of this invention will become apparent upon the reading of the following detailed description of a preferred embodiment.

BRIEF DESCRIPTION OF THE DRAWINGS

A preferred embodiment of this invention as illustrated in the accompanying drawings, in which:

FIG. 1 is a fragmentary bottom view of a wing section of an amphibious airplane showing a combination hydrofoil and wheel apparatus embodying the principles of this invention, the hydrofoil is shown in the lowered landing position with the wheel apparatus positioned for landing on ground;

FIG. 2 is a fragmentary cross sectional view taken along line 2—2 in FIG. 1 illustrating the drive mechanism for lowering the hydrofoil;

FIG. 3 is a fragmentary cross sectional view taken along line 3—3 in FIG. 1 illustrating the wheel apparatus movably mounted to the hydrofoil;

FIG. 4 is a fragmentary cross sectional view taken along line 4—4 in FIG. 1 illustrating a pivot connection slidably mounted in the wing section for supporting one end of the hydrofoil;

FIG. 5 is a fragmentary cross sectional view taken along line 5—5 in FIG. 1 showing a drive mechanism for lowering and raising the wheel apparatus;

FIG. 6 is a fragmentary bottom view similar to FIG. 1 except showing the hydrofoil in the raised cruising position within a well formed in the wing section with the wheel apparatus positioned in the inoperative raised position;

FIG. 7 is a fragmentary cross sectional view taken along line 7—7 in FIG. 6 showing in more detail a cross section of the hydrofoil positioned in the well;

FIG. 8 is a fragmentary cross sectional view taken along line 8—8 in FIG. 6 showing in more detail the wheel apparatus movably mounted on the hydrofoil;

FIG. 9 is a fragmentary cross sectional view taken along line 9—9 in FIG. 6 showing a retainer guide holding the central portion of the hydrofoil in the raised cruising position in the well;

FIG. 12 is a fragmentary illustrated front view of an amphibious airplane showing a hydrofoil extending downward from one of the wing sections in preparation for landing; and FIG. 13 is an illustrated fragmentary front view similar to FIG. 12 except showing the hydrofoil in the elevated cruising position with the hydrofoil resting within the well underneath the wing section.

DETAILED DESCRIPTION OF A PREFERRED EMBODIMENT

General

Figure 10:
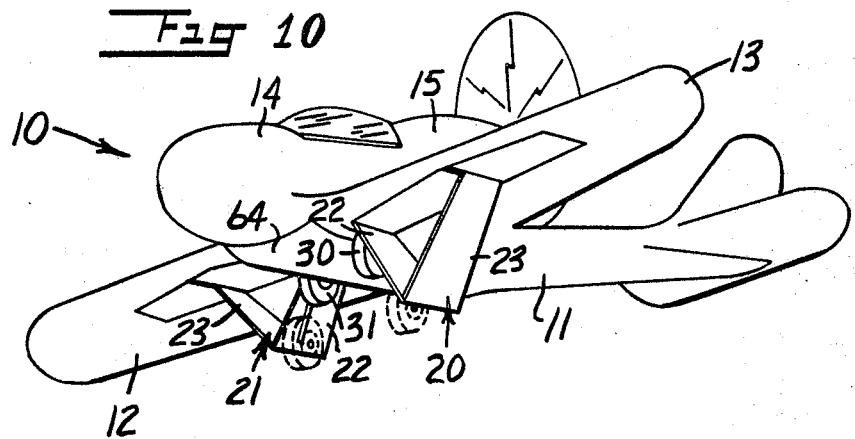
FIG. 10 is an illustrated perspective view of an amphibious airplane showing hydrofoils mounted under each wing section with the hydrofoils folded downwardly in a V-shape; the wheel assemblies are shown in solid line in the raised position and in dotted line in the lowered landing position.

Referring now to the drawings and in particular to FIG. 10, there is shown a pusher-type amphibious airplane 10 with a fuselage 11, a right wing section 12 and a left wing section 13. A cockpit 14 is formed in the forward part of the fuselage 11 with the engine housing 15 behind the cockpit in the elevated position. The prop 16 is facing rearward as is typical with pusher-type airplanes.

This invention is particularly concerned with the landing gear for the amphibious airplane for enabling the airplane to land on either water or land. The landing gear includes a left foldable hydrofoil 20 and a right foldable hydrofoil 21 that are mounted underneath the wing sections 13 and 12 respectively. As shown in FIG. 10 hydrofoils extend transversely to the path of the plane underneath the respective wing sections. Each of the hydrofoils 20 and 21 has two interconnected hydrofoil elements 22 and 23.

The hydrofoil element 22 has an outer end 24 and an inner end 25 (FIGS. 1, 3 and 4). The hydrofoil element 23 has an outer end 26 and an inner end 27 (FIGS. 1, 2 and 3). The inner ends 25 and 27 are pivotally interconnected by a hinge joint 28 (FIG. 3).

Wheel assemblies 30 and 31 are mounted on the hydrofoils 20 and 21 respectively. The wheel assemblies 30 and 31 have landing wheels 32 and 33 respectively that may be moved up and down on the hydrofoils from an elevated inoperative position to a lowered landing position in which the lower profile of the wheel extends below the hinge joint 28 of the hydrofoil elements for engaging the ground on landing.

Hydrofoil

The details of the hydrofoils 21 and 22 are substantially the same, therefore for simplicity purposes only one of the hydrofoils will be described. The inner ends 25 and 27 of the hydrofoil elements each have bevelled end surfaces 36 and 37 respectively (FIGS. 3 and 9) that engage each other when the hydrofoil elements are folded together to form the V-shape landing configuration.

The outer ends 24 and 26 of the hydrofoil element are pivotally and movably mounted to the underside of the wing section. The outer end 24 is pivotally connected to a pivot block 38 (FIG. 4) that is mounted in the wing section adjacent the fuselage. The pivot block 38 has pins 39 extending outwardly into bearings 40 mounted in the outer end 24. The pivot block 38 is slidably mounted in a track 42 for limited movement to enable the block 38 to slide back and forth a limited distance parallel with the longitudinal axis of the wing section. A tension spring 43 is attached between the pivot block 38 and a bracket 44 which is rigidly mounted to the air frame. In this manner the pivot block 38 is biased inwardly towards the fuselage or to the left as shown in FIG. 4.

The outer end 26 of the hydrofoil element 23 is pivotally connected to a collar block 46 (FIGS. 2 and 7) mounted within the wing section. The collar block 46 is mounted on a lead screw 52 for longitudinal movement along the screw as the screw is rotated. Pins 47 and 48 (FIG. 7) extend outwardly from the sides of the outer end 26 and are slidably mounted in tracks 50 and 51 mounted in the wing section parallel to the longitudinal axis of the wing section. The lead screw 52 is rotatably supported in bearings 53, 54 and 55 mounted within the wing section.

As shown in FIGS. 12 and 13 the lead screw 52 is driven by a motor 56. The motor 56 has a shaft 57 that extends outwardly therefrom that may be turned by a crank in case the motor is inoperative.

The hydrofoil when it is in the raised cruising position is mounted in a shallow elongated well 58 that has a housing structure 59. The hinge joint 28 has a hinge shaft 60 that extends outwardly to the sides as may be seen in FIGS. 1, 6 and 9. The ends of the hinge shaft 60 engage and are biased upward by retaining guides 61 and 62 to support the hydrofoil ends 25 and 27 when the hydrofoil is in the raised cruising position as shown in FIG. 9. The retaining guides 61, 62 are principally leaf springs that extend outwardly and downwardly to receive the ends of the hinge shaft 60. When the hydrofoils are in the raised cruising position (FIGS. 6 and 13) in the wells 58, the tension spring 43 is extended with the pivot block 38 bearing against the outer end of the track 42.

To fold the hydrofoil to the landing position the pilot energizes the motor 56 to rotate the lead screw 52. During the initial rotation of the lead screw 52 the hydrofoil remains in the substantially flat configuration and moves as a unit inwardly toward the fuselage until the pivot block 38 engages the inside end of the track 42. During this flat movement to ward the fuselage the ends of the hinge shaft 60 slide along and down the retaining guides 61 and 62. When the pivot block 38 abuts the inside end of the track 42 the ends of the hinge shaft 60 are beyond the retaining guides 61 and 62. The continued rotation of the lead screw 52 causes the hydrofoil elements to fold inward about the hinge joint 28 and move downwardly with the outer end 26 moving toward the outer end 24 to form a V-shaped configuration. When the hydrofoil elements are folded to the landing position, the bevelled end surfaces 36 and 37 engage each other (FIG. 3) and the collar block 46 engages a limit switch 63 (FIG. 2) to inactivate the motor 56. At this point the pilot is ready to land the amphibious airplane in water.

As illustrated in FIG. 7 the hydrofoil element has an elongated hydrofoil cross section that provides an uplift when the airplane is moving through the water to maintain the fuselage from making contact with the water. When the speed of the airplane in the water decreases to a very low speed of approximately three to five miles per hour, the amount of uplift from the hydrofoil is insufficient so the airplane merely settles into the water. This means that the amphibious airplane does not need a sturdy boat-like hull for landing in water but merely needs a flotation tank 64 mounted to the underside of the airplane. This feature substantially reduces the cost and weight of the amphibious airplane and enables the profile of the airplane to be designed principally for aerodynamic performance rather than for water landing.

Wheel assemblies

The details of each of the wheel assemblies 30 and 31 are substantially the same, therefore, for simplicity purposes the wheel assembly 31 will be described in detail. To accommodate the wheel assembly a slot 65 is formed on the outer surface of the hydrofoil element 22. The landing wheel 33 has an axle 66 (FIGS. 3 and 8) that extends from the wheel through the slot 65 to an axle block 67 slidably mounted along the length of the hydrofoil element 22. The block 67 slides in parallel facing tracks 68 and 69 mounted within the hydrofoil element 22.

A lead screw 71 extends the substantial length of the hydrofoil element 22 and through the axle block 67 to move the axle block in the tracks 68 and 69. The lead screw 71 is rotatably mounted in bearings 71 and 73 (FIGS. 3 and 5). The lead screw 71 is rotated by a motor 75 (FIG. 5) mounted in the fuselage adjacent the wing section. A universal joint 77 interconnects the motor with the lead screw. The motor has an extendable shaft 78 that connects with the universal joint.

Figure 11:
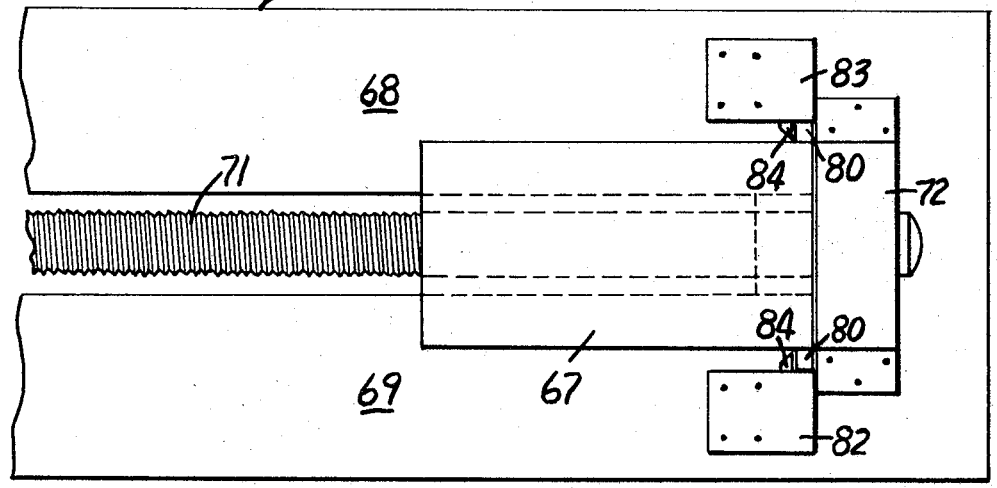
FIG. 11 is a fragmentary plan view of a portion of the drive mechanism of the landing wheel emphasizing means for locking the landing wheel in the lowered landing position.

A lock mechanism (FIG. 11) is provided for engaging the axle block 67 when it is in the lower position. The locking mechanism includes tab projections 80 that extend from both sides of the block 67 as shown in FIG. 11. Solenoid operated locks 82 and 83 are mounted in the hydrofoil element 22 alongside the path of the block 67. Each of the locks 82 and 83 has a spring biased tongue 84 that extends outwardly therefrom into the path of the projections 80. As the axle block moves downwardly the projections move against the spring biased tongues 84 and then pass by enabling the spring biased tongues to move outwardly to lock the axle block in the down position. When it is desired to move the wheel assemblies to the raised position, the tongues 84 are retracted by solenoids to enable the axle block to move upwardly along the lead screw.

When the pilot desires to land on the ground, he operates the motor 56 to extend the hydrofoils to the V-shaped position and then activates the motor 75 to turn the lead screw 71 to move the wheel assemblies to the down landing position as shown by the dotted lines in FIG. 10.

From the above description one may readily appreciate the structural simplicity of hydrofoils 20 and 21, the mechanism for moving the hydrofoils and the apparatus for positioning the wheel assemblies. The hydrofoils 20 and 21 are normally positioned within the walls so that the hydrofoils do not change the aerodynamic performance of the airplane during cruising. As previously mentioned, hydrofoils 20 and 21 enable the amphibious airplane to be constructed without a boat-like hull thereby greatly reducing the cost and weight of the airplane while increasing the aerodynamic performance of the airplane.

Furthermore, the angle between the hydrofoil elements may be varied to enable the airplane to be landed in relatively shallow water and then taxied onto the beach. The versatility of the landing gear enables it to readily adapt to a large number of possible landing sites.

It should be understood that the above described embodiment is simply illustrative of the principles of this invention and numerous other embodiments may be readily devised without deviating from the scope and principles thereof. Therefore, only the following claims are intended to define this invention.

What is claimed is:

1. A hydrofoil apparatus for an amphibious airplane comprising:

an elongated hydrofoil foldable intermediate the ends thereof mounted beneath the airplane with the ends thereof pivotally connected to the airplane, in which at least one end is also movably connected to the airplane for movement to and from the other end; and drive means mounted on the airplane and operatively connected to the movable end for folding said movable end away from and toward the other end to move the hydrofoil between a cruising raised position and a landing V-shaped lowered position.

2. A hydrofoil apparatus as defined in claim 1 wherein the hydrofoil is mounted to the underside of one of the airplane wing sections.

3. A hydrofoil apparatus as defined in claim 1 wherein the movable end is movably mounted in a race that extends transversely to the direction of travel of the airplane and wherein the drive means includes a lead screw that is operatively connected to said movable end for folding the movable end toward and away from the other end to lower and raise the hydrofoil.

4. A hydrofoil apparatus as defined in claim 1 wherein the airplane has a well formed therein for receiving the hydrofoil when the hydrofoil is raised to the cruising position to remove the hydrofoil from the airstream.

5. A hydrofoil apparatus as defined in claim 4 further comprising retaining guides mounted to the underside of the airplane for operatively engaging the hydrofoil when the hydrofoil is in the raised cruising position to secure the hydrofoil within the well.

6. A hydrofoil apparatus as defined in claim 1 further comprising one or more landing wheels mounted on the hydrofoil elements to enable the airplane to land on the ground or in the water.

7. A hydrofoil apparatus as defined in claim 6 wherein the wheel is movably mounted on the hydrofoil for movement when the hydrofoil is in the landing V-shaped position between a raised position adjacent the airplane and a lowered landing position adjacent the apex of the hydrofoil with the wheel extending below the hydrofoil to make ground contact and wherein a drive means is mounted on the airplane and operatively connected to the wheel for moving the wheel between the raised position and the lowered landing position.

8. A landing gear for an amphibious airplane to enable the airplane to land either on water or on land, said landing gear comprising:

a V-shaped hydrofoil having two elongated interconnected legs that extend downward from a wing section to enable the airplane to land on water;

a landing wheel movably mounted on the hydrofoil for movement between an inoperative raised position with the wheel adjacent the wing section and a lowered ground landing position with the wheel projecting below the V-shaped hydrofoil; and drive means mounted to the airplane and operatively connected to the landing wheel for moving the landing wheel between the inoperative position and the ground landing position.

9. A landing gear as defined in claim 8 wherein the landing wheel is movably mounted in a track that is mounted in one of the legs of the hydrofoil.

10. A landing gear as defined in claim 9 wherein the drive means includes a lead screw operatively connected to the landing wheel for moving the landing wheel between the inoperative position and the ground engaging position.

11. A landing gear as defined in claim 8 wherein the V-shaped hydrofoil is foldable, the legs of the hydrofoil being pivotally attached to the wing section.

References Cited

UNITED STATES PATENTS

| 2,153,266 | 4/1939  | Minshall et al. | 244—105 XR |
| 2,214,945 | 9/1940  | Weihmiller      | 244—102    |
| 2,647,709 | 8/1953  | Doolittle et al.| 244—108    |
| 3,347,499 | 10/1967 | Larkin          | 244—105 XR |

MILTON BUCHLER, Primary Examiner

P. E. SAUBERER, Assistant Examiner